(12) United States Patent
Lu et al.

(10) Patent No.: US 9,171,050 B2
(45) Date of Patent: Oct. 27, 2015

(54) DATA SYNCHRONIZATION SYSTEM AND METHOD FOR SYNCHRONIZING DATA

(71) Applicant: INSTITUTE FOR INFORMATION INDUSTRY, Taipei (TW)

(72) Inventors: Shih-Yu Lu, Nantou County (TW); Hsin-Tse Lu, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 261 days.

(21) Appl. No.: 13/786,425

(22) Filed: Mar. 5, 2013

(65) Prior Publication Data

US 2014/0164325 A1 Jun. 12, 2014

(30) Foreign Application Priority Data

Dec. 7, 2012 (TW) .............................. 101146115 A

(51) Int. Cl.
*G06F 17/30* (2006.01)
(52) U.S. Cl.
CPC ................................ *G06F 17/30575* (2013.01)
(58) Field of Classification Search
CPC ................................................. G06F 17/30575
USPC ....................................................... 707/617
See application file for complete search history.

(56) References Cited

U.S. PATENT DOCUMENTS

| | | | |
|---|---|---|---|
| 7,720,935 B2 | 5/2010 | Anantha | |
| 8,209,343 B2 | 6/2012 | Joshi et al. | |
| 2002/0056011 A1* | 5/2002 | Nardone et al. | 709/248 |
| 2007/0271309 A1* | 11/2007 | Witriol et al. | 707/201 |
| 2008/0082555 A1* | 4/2008 | Salmon et al. | 707/100 |
| 2010/0088328 A1* | 4/2010 | Joshi et al. | 707/758 |
| 2010/0257229 A1* | 10/2010 | Bolohan et al. | 709/203 |
| 2011/0184993 A1 | 7/2011 | Chawla et al. | |
| 2011/0251992 A1* | 10/2011 | Bethlehem et al. | 707/610 |

* cited by examiner

*Primary Examiner* — Shiow-Jy Fan
(74) *Attorney, Agent, or Firm* — CKC & Partners Co., Ltd.

(57) ABSTRACT

A data synchronization system includes a database, a management device, and a synchronization device. The database includes user folders, and the management device includes an authentication module and a data storage module. The authentication module authenticates the identification of the user who uses a client terminal device to log in the authentication module and output an authentication signal based on the result of the identification. The data storage module receives the authentication signal and output an index signal based on the authentication signal. The client terminal device is configured to connect to a corresponding user folder based on the index signal, and the corresponding user folder is used as a major user folder. The synchronization device logs in one of the accounts of a commercial database and synchronizes the data of the account to the major user folder. Furthermore, a method for synchronizing data is also disclosed herein.

4 Claims, 2 Drawing Sheets

200

DATA SYNCHRONIZATION SYSTEM AND METHOD FOR SYNCHRONIZING DATA

RELATED APPLICATIONS

This application claims priority to Taiwan Application Serial Number 101146115, filed Dec. 7, 2012, which is herein incorporated by reference.

BACKGROUND

1. Field of Invention

The embodiment of the present invention relates generally to a synchronization system and method thereof and, more particularly, to a data synchronization system and a method for synchronizing data.

2. Description of Related Art

The idea of cloud computation progresses with the development of science and technology. Under the application of cloud computation, users are allowed to store their data in a remote storage device and use the communication between an electronic device and the storage device to access the data.

Generally, if a user intends to compute the data stored in the remote device using the electronic device, the user must synchronize the data to the electronic device, before the computation starts. In this scenario, the data synchronization process or the download of data from the cloud storage device to the electronic device would cost substantial time for data transfer.

Further, if multiple users use the same virtual machines, when one of the multiple users logs in, said user would not necessarily be designated the same virtual machine that he/she used during his/her previous log-in. In this case, the user would not immediately have access to his/her data during the current log-in.

Many efforts have been devoted trying to find a solution of the aforementioned problems. Nonetheless, there still a need to improve the existing apparatus and techniques in the art.

SUMMARY

One purpose of the present invention is to provide a data synchronization system and a method for synchronizing data, so as to address the problems associated with existing data synchronization systems.

To this purpose, on aspect of the present invention is directed to a data synchronization system which comprises a database, a management device and a synchronization device. Further, the database comprises a plurality of user folders, and the management device comprises an authentication module and data storage module. Structurally, the management device is communicatively connected to the database, and the synchronization device is communicatively connected to the management device. Specifically, the authentication module is communicatively connected to a client terminal device, and the data storage module is communicatively connected to the authentication module.

In operation, the authentication module is configured to authenticate the identification of the user who uses a client terminal device to log in the authentication module and output an authentication signal based on the result of the identification. The data storing module is configured to receive the authentication signal and output an index signal based on the authentication signal. The client terminal device is configured to connect to a corresponding user folder based on the index signal, and the corresponding user folder is used as a major user folder. The synchronization device is configured to log in one of accounts of a commercial database and synchronize the data of the account to the major user folder. The client terminal device is configured to connect to a corresponding user folder based on the index signal, and the corresponding user folder is used as a major user folder. The synchronization device is configured to log in one of the accounts of a commercial database and synchronize the data of the account to the major user folder.

According to one embodiment of the present invention, the data synchronization system further comprises a hypervisor which is communicatively connected between the database and the management device. The hypervisor has a plurality of virtual machines installed therein, and is configured to retrieve the data from the major user folder based on the index signal.

According to another embodiment of the present invention, the management device further comprises a virtual machine management module which is communicatively connected to the authentication module. The virtual machine management module is configured to provide an operating-system (OS) selection interface, and outputs a selection signal based on an OS selection result. The hypervisor receives the OS selection signal such that the client terminal device is operated in the corresponding operating system.

According to yet another embodiment of the present invention, the synchronization device is continuously in communication with the commercial database.

According to still another embodiment of the present invention, the synchronization device continuously synchronizes the data of the account to the major user folder.

To achieve the above-mentioned purpose of the present invention, another aspect of the present invention is directed to a method for synchronizing data which is used in a data synchronization system. Said data synchronization device comprises a database, a management device and a synchronization device, in which the management device is communicatively connected to the database, and the synchronization device is communicatively connected to the management device. Said method for synchronizing data comprises the following steps:

using the management device to authenticate the identity of a user who uses a client terminal device to log in the management device;

using the management device to output an authentication signal based on the result of the authentication;

using the management device to receive the authentication signal and output an index signal based on the authentication signal;

the client terminal device connecting to a corresponding user folder in the database based on the index signal, such that the corresponding user folder serves as a major user folder; and using the synchronization device to log in one of the accounts of a commercial database based on the authentication signal, and synchronize the data of the account to the major virtual machine.

According to one embodiment of the present invention, the data synchronization system further comprises a hypervisor that is communicatively connected between the database and the management device. The method for synchronizing data further comprises using the hypervisor to retrieve the data from the major user folder based on the index signal.

According to another embodiment of the present invention, the method for synchronizing data further comprises the following steps;

providing an operating-system (OS) selection interface;

outputting a selection signal based on an OS selection result; and using the hypervisor to receive the OS selection signal such that the client terminal device is operated in the corresponding operating system.

According to yet another embodiment of the present invention, the synchronization device is continuously in communication with the commercial database.

According to still another embodiment of the present invention, the synchronization device continuously synchronizes the data of the account to the major user folder.

In view of the foregoing summary of the present disclosure, embodiments of the present invention provides a data synchronization device and a method for synchronizing data so as to address the problems associated with existing data synchronization system; said problems, for example, include the waste of substantial time for the data synchronization or downloading data from the cloud storage device to the electronic device.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
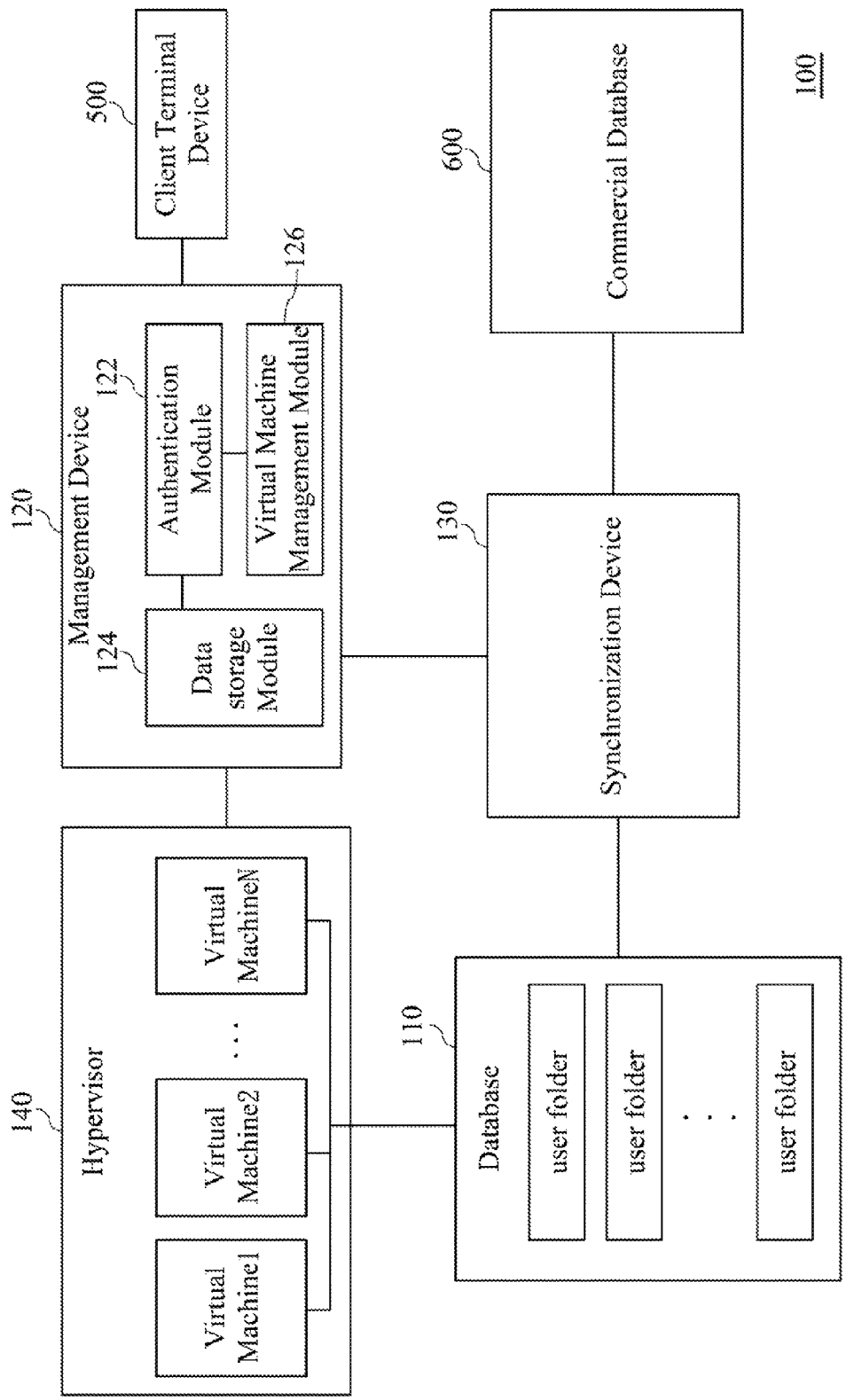
FIG. 1 schematically shows a circuit block diagram of a data synchronization system according to embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes in and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

As used herein, the terms "comprising," "including," "having" "containing," "involving," and the like are to be understood to be open-ended, i.e., to mean including but not limited to.

FIG. 1 schematically shows a circuit block diagram of a data synchronization system according to embodiments of the present invention. As illustrated, the data synchronization system 100 comprises database 110, a management device 120 and a synchronization device 130. The database 110 is comprises a plurality of user folders 1~N, the management device 120 comprises an authentication module 122, a data storage module 124 and a virtual machine management module 126.

Structurally, the management device 120 is communicatively connected to the database 110, and the synchronization device 130 is communicatively connected to management device 120. The authentication module 122 is communicatively connected to a client terminal device 500, the data storage module 124 is communicatively connected to the authentication module 122, and the synchronization device 130 is communicatively connected to a commercial database 600. It is noted that the present invention is not limited to the structure depicted in FIG. 1 which only serves an example for illustrating an embodiment of the present invention.

In operation, the authentication module 122 is configured to authenticate the identification of the user ho uses a client terminal device 500 to log in the authentication module 122, and output an authentication signal based on the result of the identification. The data storing module 124 is configured to receive the authentication signal and output an index signal based on the authentication signal. The client terminal device 500 is configured to connect to a corresponding user folder based on the index signal, and the corresponding user folder is used as a major user folder. The synchronization device 130 is configured to log in one of accounts of a commercial database 600 and synchronize the data of the account to the major user folder.

In this way, the data of the user could be stored in a user folder and said user folders 1 is used as the major user folder. Further, the user could store the account ID and password for the commercial database in the data storage module 124. The synchronization device 130 could log in one of the accounts in the commercial database 600 based on the authentication signal (a signal comprising the account ID and password for the commercial database) issued from the data storage module 124, and synchronize the data of the account to the major user folder. In this case, since the data stored in the commercial database by the user in the could also be synchronized to the major user folder, when the user connects to the major user folder through the client terminal device 500, the user could immediately have access to all the data that he/she stores in the cloud terminal, thereby addressing the problem that substantial time is required for the data synchronization and the download of data from the cloud storage device to the electronic device.

In one example, the data synchronization system 100 further comprises hypervisor 140, which is communicatively connected between the database 110 and the management device 120. The hypervisor has a plurality of virtual machines 1~N installed therein, and is configured to retrieve data from the major user folder based on the index signal. In another example, the management device 120 further comprises a virtual machine management module 126, which is communicatively connected to the authentication module 122. The virtual machine management module 126 is configured to provide an operating-system (OS) selection interface, and output an OS selection signal based on the OS selection result. The hypervisor 140 receives the OS selection signal such that the client terminal device 500 is operated in the corresponding operating system.

For example, the user may select a custom operating system through the operating-system (OS) selection interface provided by the virtual machine management module 126. Said operating systems include, but are not limited to Windows, Mac, Linux, APP server, etc. Next, the virtual machine management module 126, based on the selection result of the user, outputs an OS selection signal to the hypervisor 140; and the hypervisor 140 receives the OS selection signal and provides a corresponding virtual machine to the client terminal device 500 based on the OS selection signal, such that the client terminal device 500 is operated in a corresponding operating system. However, the operating systems suitable for use in the present invention is not limited to those recited above; rather, persons having ordinary skill in the art would choose suitable operating system depending on their actual needs.

In yet another example, the synchronization device 130 is continuously in communication with the commercial database 600. In one example, the synchronization device 130 continuously synchronizes the data of the account to the major user folder. In this way, the synchronization device 130 could synchronize the data that the user stored in the commercial database 600 to the major user folder at any times, and therefore, when the user connects to the is major user folder through the client terminal device 500, the user could immediately have access to all the data that he/she stores in the cloud terminal.

Figure 2:
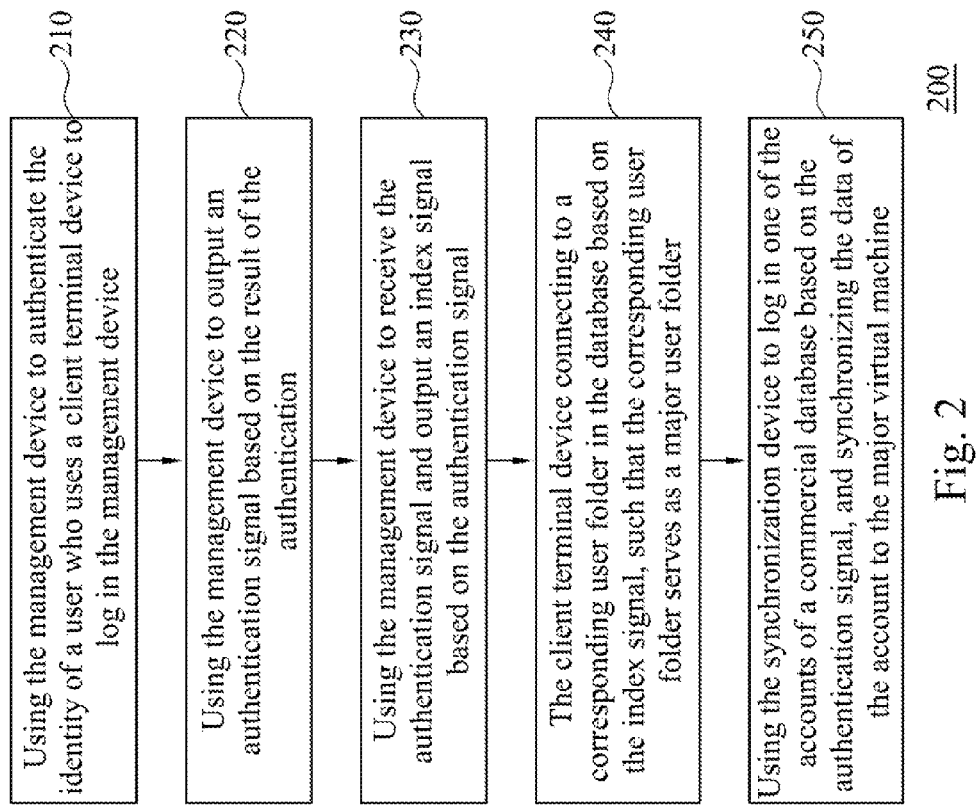
FIG. 2 schematically shows a flow diagram of a method for synchronizing data according to embodiments of the present invention.

FIG. 2 schematically shows a flow diagram of a method for synchronizing data according to embodiments of the present invention. The method 200 for synchronizing data comprises the following steps:

Step 210: using the management device to authenticate the identity of a user who uses a client terminal device to log in the management device;

Step 220: using the management device to output an authentication signal based on the result of the authentication;

Step 230: using the management device to receive the authentication signal and output an index signal based on the authentication signal;

Step 240: the client terminal device connecting to a corresponding user folder in the database based on the index signal, such that the corresponding user folder serves as a major user folder; and Step 250: using the synchronization device to log in one of the accounts of a commercial database based on the authentication signal, and synchronize the data of the account to the major virtual machine.

To facilitate the understanding of the method 200 for synchronizing data according to present invention, the following description is provided in connection with both FIG. 1 and FIG. 2.

In Step 210, the management device 120 is used to authenticate the identity of a user who uses a client terminal device 500 to log in the management device 120. In Step 220, the management device 120 is used to output an authentication signal based on the result of the authentication. Next, as illustrated in Step 230, the management device 120 is used to receive the authentication signal and output an index signal based on the authentication signal.

In addition, in Step 240, the client terminal device 500 connects to a corresponding user folder in the database 110 based on the index signal in which the corresponding user folder is used as the major user folder. Thereafter, in Step 250, the synchronization device 130 is used to log in one of the accounts of the commercial database 600 based on the authentication signal, and synchronize the data of the account to the major user folder. Therefore, when the user connects to the major user folder through the client terminal device 500, the user could immediately have access to all the data that he/she stores in the cloud terminal, thereby addressing the problem that substantial time is required for the data synchronization and the download of data from the cloud storage device to the electronic device.

In one example, the data synchronization system further comprise hypervisor which is communicatively connected between the database and the management device. The method for synchronizing data further comprises using the hypervisor to retrieve the data from the major user folder based on the index signal. In another example, the method 200 for synchronizing data further comprises the following steps:

providing an operating-system (OS) selection interface;

outputting a selection signal based on an OS selection result; and using the hypervisor to receive the OS selection signal such that the client terminal device is operated in the corresponding operating system.

For example, in above-mentioned steps, the user may select a custom operating system through the operating-system (OS) selection interface provided by the virtual machine management module 126. Said operating systems include, but are not limited to Windows, Mac, Linux, APP server, etc. Next, the virtual machine management module 126, based on the selection result of the user, outputs an OS selection signal to the hypervisor 140; and the hypervisor 140 receives the OS selection signal and provides a corresponding virtual machine to the client terminal device 500 based on the OS selection signal, such that the client terminal device 500 is operated in a corresponding operating system. However, the operating systems suitable for use in the present invention is not limited to those recited above; rather, persons having ordinary skill in the art would choose suitable operating system depending on their actual needs.

According to yet another embodiment of the present invention, the synchronization device is continuously in communication with the commercial database. According to still another embodiment of the present invention, the synchronization device continuously synchronizes the data of the account to the major user folder.

In this way, the synchronization device 130 could synchronize the data that the user stored in the commercial database 600 to the major user folder at any times, and therefore, when the user connects to the major user folder through the client terminal device 500, the user could immediately have access to all the data that he/she stores in the cloud terminal.

Those having skill in the art will appreciate that the method for synchronizing data can be performed with software, hardware, and/or firmware. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Those skilled in the art will recognize that optical aspects of implementations will typically employ optically oriented hardware, software, and or firmware.

In addition, those skilled in the art will appreciate that each of the steps of the method for synchronizing data named after the function thereof is merely used to describe the technology in the embodiment of the present invention in detail but not limited to. Therefore, combining the steps of said method into one step, dividing the steps into several steps, or rearranging the order of the steps is within the scope of the embodiment in the present invention.

In view of the foregoing embodiments of the present invention, many advantages of the present invention are now apparent. The embodiment of the present invention provides a data synchronization device and a method for synchronizing data, which are used to address the problem that substantial time is required for the data synchronization and the download of data from the cloud storage device to the electronic device.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:

1. A data synchronization system, comprising:
    a hardware processor;
    a memory coupled with the hardware processor;
    a database comprising a plurality of user folders;
    a management device communicatively connected to the database, wherein the management device comprises:
        an authentication module communicatively connected to a client terminal device, wherein the authentication module is configured to authenticate the identity of a user who uses a client terminal device to log in the authentication module and output an authentication signal based on the result of the authentication; and
        a data storage module communicatively connected to the authentication module for receiving the authentication signal and outputting an index signal based on the authentication signal, wherein the client terminal device is configured to connect to a corresponding user folder based on the index signal, and the corresponding user folder is used as a major user folder; and
    a synchronization device communicatively connected to the management device for logging in one of the accounts of a commercial database based on the authentication signal and synchronizing the data of the account to the major user folder;
    a hypervisor, communicatively connected between the database and the management device, wherein the hypervisor has a plurality of virtual machines installed therein, and is configured to retrieve the data from the major user folder based on the index signal;
    a virtual machine management module, communicatively connected to the authentication module, wherein the virtual machine management module is configured to provide an operating system (OS) selection interface, and outputs a selection signal based on an OS selection result, wherein the hypervisor receives the OS selection signal such that the client terminal device is operated in the corresponding operating system;
    wherein the synchronization device continuously synchronizes the data of the account to the major user folder.

2. The data synchronization system according to claim 1, wherein the synchronization device is continuously in communication with the commercial database.

3. A method for synchronizing data, which is used in a data synchronization system, wherein the data synchronization device comprises a database, a management device and a synchronization device, wherein the management device is communicatively connected to the database, and the synchronization device is communicatively connected to the management device, wherein the method for synchronizing data comprises:
    using the management device to authenticate the identity of a user who uses a client terminal device to log in the management device;
    using the management device to output an authentication signal based on the result of the authentication;
    using the management device to receive the authentication signal and output an index signal based on the authentication signal;
    the client terminal device connecting to a corresponding user folder in the database based on the index signal, such that the corresponding user folder serves as a major user folder; and
    using the synchronization device to log in one of the accounts of a commercial database based on the authentication signal, and synchronize the data of the account to the major virtual machine;
    wherein the data synchronization system further comprises a hypervisor that is communicatively connected between the database and the management device, wherein the method for synchronizing data further comprises:
    using the hypervisor to retrieve the data from the major user folder based on the index signal;
    providing an operating-system (OS) selection interface;
    outputting a selection signal based on an OS selection result; and
    using the hypervisor to receive the OS selection signal such that the client terminal device is operated in the corresponding operating system;
    wherein the synchronization device continuously synchronizes the data of the account to the major user folder.

4. The method for synchronizing data according to claim 3, wherein the synchronization device is continuously in communication with the commercial database.

* * * * *